United States Patent
Sofka

(10) Patent No.: US 10,412,105 B2
(45) Date of Patent: *Sep. 10, 2019

(54) AUTOMATIC DETECTION OF NETWORK THREATS BASED ON MODELING SEQUENTIAL BEHAVIOR IN NETWORK TRAFFIC

(71) Applicant: Cisco Technology, Inc., San Jose, CA (US)

(72) Inventor: Michal Sofka, Princeton, NJ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,572

(22) Filed: Oct. 16, 2018

(65) Prior Publication Data
US 2019/0052656 A1 Feb. 14, 2019

Related U.S. Application Data

(63) Continuation of application No. 15/253,659, filed on Aug. 31, 2016, now Pat. No. 10,154,051.

(51) Int. Cl.
*H04L 29/06* (2006.01)
*G06N 3/04* (2006.01)
*G06N 3/08* (2006.01)

(52) U.S. Cl.
CPC ....... *H04L 63/1416* (2013.01); *G06N 3/0445* (2013.01); *G06N 3/0454* (2013.01); *H04L 63/1483* (2013.01); *G06N 3/084* (2013.01)

(58) Field of Classification Search
CPC . H04L 63/14; H04L 63/1416; H04L 63/1408; H04L 63/1441; H04L 63/08; H04L 63/09; G06F 21/56; G06F 21/57; G06N 3/0445; G06N 3/0454; G06N 3/084
See application file for complete search history.

(56) References Cited

U.S. PATENT DOCUMENTS

| | | | |
|---|---|---|---|
| 2013/0104230 A1* | 4/2013 | Tang | G06F 21/552 726/23 |
| 2016/0350532 A1* | 12/2016 | Davis | G06F 21/564 |
| 2017/0134397 A1* | 5/2017 | Dennison | G06F 16/9535 |
| 2017/0187747 A1* | 6/2017 | Huston, III | H04L 63/1458 |
| 2017/0228633 A1* | 8/2017 | Danihelka | G06K 9/6257 |

* cited by examiner

*Primary Examiner* — Khalil Naghdali
*Assistant Examiner* — Shaqueal D Wade
(74) *Attorney, Agent, or Firm* — Behmke Innovation Group LLC; James Behmke; Stephen D. LeBarron

(57) ABSTRACT

A computer-implemented data processing method comprises: executing a recurrent neural network (RNN) comprising nodes each implemented as a Long Short-Term Memory (LSTM) cell and comprising links between nodes that represent outputs of LSTM cells and inputs to LSTM cells, wherein each LSTM cell implements an input layer, hidden layer and output layer of the RNN; receiving network traffic data associated with networked computers; extracting feature data representing features of the network traffic data and providing the feature data to the RNN; classifying individual Uniform Resource Locators (URLs) as malicious or legitimate using LSTM cells of the input layer, wherein inputs to the LSTM cells are individual characters of the URLs, and wherein the LSTM cells generate feature representation; based on the feature representation, generating signals to a firewall device specifying either admitting or denying the URLs.

20 Claims, 7 Drawing Sheets

AUTOMATIC DETECTION OF NETWORK THREATS BASED ON MODELING SEQUENTIAL BEHAVIOR IN NETWORK TRAFFIC

CROSS-REFERENCE TO RELATED APPLICATIONS; BENEFIT CLAIM

This application claims the benefit as a continuation of application Ser. No. 15/253,659, filed Aug. 31, 2016 the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure is in the technical field of computer network security. The disclosure also is in the technical field of computer-implemented classification of network traffic to identify possible network threats represented in the network traffic.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network security incidents comprise several events, steps or actions that an attacker takes to compromise a targeted network and extract proprietary data. Such steps may include scanning potential targets, initial infection, library download, or communication with a command and control server. The events can be identified from a sequence of proxy logs of network traffic communication, which are usually created and stored automatically by routers, switches, servers or other network infrastructure. Log records typically are collected in five-minute batches. Features from individual proxy logs can be computed and used in a software-based classifier to identify events; sometimes, the features extracted from the proxy log fields are used to classify each proxy log by itself.

Long short-term memory (LSTM) architectures have been proposed to address the difficulties of training recurrent neural networks (RNNs) due to exploding and vanishing gradients. The exploding gradient problem can be addressed by limiting the gradient by an upper threshold. A character-level RNN can be used to classify text sentences, by training the RNN in an unsupervised way to predict the next character in the sequence to build a neural translation model. LSTMs have been used to provide text description of images and videos.

SUMMARY

The appended claims may serve as a summary of the invention.

DESCRIPTION OF EXAMPLE EMBODIMENTS

Figure 1:
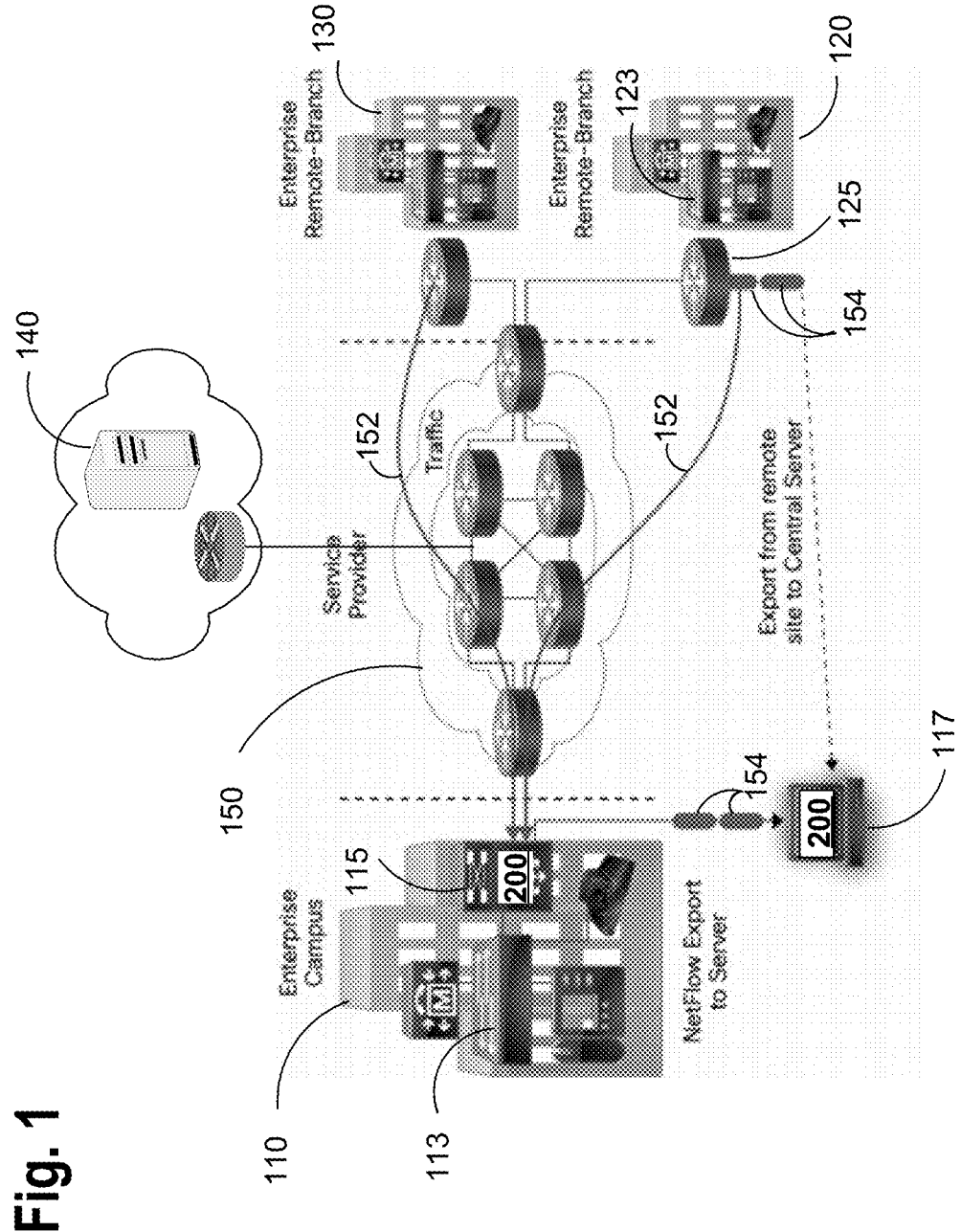
FIG. 1 illustrates an example operating environment upon which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1. GENERAL OVERVIEW
2. EXAMPLE OPERATING ENVIRONMENT AND PROGRAMMED METHOD
3. EXAMPLE IMPLEMENTATION OF CLASSIFICATION AND DESCRIPTION METHODS
    3.1 SEQUENCES OF CHARACTERS IN URL STRINGS
    3.2 UNSUPERVISED TRAINING
    3.3 SEQUENCES OF FLOWS FOR A USER CONNECTION
    3.4 SEQUENCES OF USER CONNECTIONS
    3.5 KEYWORD DESCRIPTION OF USER CONNECTIONS
4. HARDWARE OVERVIEW

1. GENERAL OVERVIEW

In one embodiment, a computer-implemented data processing method providing an improvement in computer security comprises: using programmed computer instructions, executing, in computer memory, a recurrent neural network (RNN) comprising a plurality of nodes each implemented as a Long Short-Term Memory (LSTM) cell and comprising a plurality of links between nodes that represent outputs of LSTM cells and inputs to LSTM cells, wherein each LSTM cell implements an input layer, hidden layer and output layer of the RNN; receiving, from a networked computer, network traffic data associated with one or more networked computers; extracting feature data representing a plurality of features of the network traffic data and providing the feature data to the RNN; classifying one or more individual Uniform Resource Locators (URLs) as malicious or legitimate using a plurality of first LSTM cells of the input layer, wherein inputs to the first LSTM cells are individual characters of the one or more URLs, and yield a final classification output; based on the final classification output, generating signals to a firewall device specifying either admitting or denying the one or more URLs.

Other aspects, features and embodiments will become apparent from the disclosure as a whole.

In an embodiment, computer-implemented executable instructions are programmed to exploit the sequential nature of network communication data to solve problems in current classification systems as applied to network traffic and detection of network threats represented in network traffic. In an embodiment, features at each level of processing, such as classifiers of individual proxy logs, events, or users, learn representations at various levels automatically. Further, the context and long-range dependencies of features in the sequential traffic data is taken into account using a computer architecture that can model dependencies that are far apart, for example, two events that occurred in two distant time points. In addition, embodiments provide a way to train the representations in an unsupervised way and to use them in automatic description of threats by phrases.

Embodiments have particular applicability to sequential modeling in security datasets without the need for manually designing features and expert rules, which becomes untenable when trying to keep up with ever increasing malware samples. Various embodiments provide numerous benefits as compared to past practice, including automatically learning feature representations of proxy logs, events, and user communication. As another benefit, learned representations are data-driven and thus can discover features and their relationships which would be hard or impossible to find out manually. An example is that the presence of the character "?" in a URL may be legitimate when it appears after the first "\" character in the URL but may indicate a malicious URL if it appears repeatedly in other positions in the URL; manually derived rules based on such a feature typically are inaccurate but because the URL is a linear sequence of characters, an LSTM-based RNN can be structured to predict the malicious nature of such a URL with high accuracy. Embodiments are programmed for exploiting long-range context when learning representations using LSTM architectures, rather than relying on rules based on related indicators of compromise that offer limited way to use contextual information. Automatically learning context dependencies is important in network traffic classification since related events might be far apart in the input data sequences. The proposed method and system improves accuracy of existing classifiers. Furthermore, based on the higher expressive power of the learned representations, embodiments make it possible to train classifiers of new behaviors. Embodiments model sequential data, and are suitable for training classifiers of HTTPs sequences, for example. The proposed method and system may be implemented using any suitable machine learning algorithm or LSTM architectures. Examples include TORCH, THEANO, and/or TENSORFLOW.

2. EXAMPLE OPERATING ENVIRONMENT AND PROGRAMMED METHOD

FIG. 1 illustrates an example operating environment upon which an embodiment may be implemented. In the example of FIG. 1, an enterprise main campus 110 and enterprise remote branches 120, 130 are coupled indirectly via an internetwork or internet 150, which carries network traffic 152. Enterprise main campus 110 comprises a first computer system 113 and a gateway computer system 115. An attacker computer system 140 may gain access to internet 150. Enterprise remote branch 120 comprises a computer system 123 and a proxy device 125.

In this arrangement, computer system 123 of branch 120 may initiate communication with computer system 113 of main campus 110 through the proxy device 125 via internet 150. Packet flows 154 from computer system 123 are routed by internetworking devices in internet 150 to the gateway computer system 115. From the gateway computer system 115, packets are routed to a destination main campus computer system 113.

In an example of processing a network threat incident, computer system 140 may be a source of a network attack. The network attack may have penetrated the branch computer system 123, and therefore packet flows from computer system 123 to main campus computer system 113 may contain malicious network attack packets. To detect the network threat, HCS logic 200 in gateway system 115 may be programmed to analyze packet flows 154 as they are received by gateway system 115.

In another embodiment, the HCS logic 200 may be in a separate computer system such as central server computer 117. In this configuration, the HCS logic 200 may import packet flow log data or files ("logs") and analyze them rather than receiving packet flows 154 directly from network. For example, the HCS logic 200 may receive logs from gateway system 115 as well as other systems on the network, such as proxy 125. The logs from proxy 125 may also contain the packet flows of the initial network attack by computer system 140 on computer system 123, since the packet flows containing the attack should have passed through proxy 125. Or, software on internetworking gear such as CISCO NETFLOW software may output NETFLOW flow data records to computer 117. Thus, using techniques described herein, the HCS logic 200 may detect the network threat incident on computer system 123 and also may trace the incident to the originating computer system 140.

A network traffic classification system having an architecture similar to FIG. 1 is disclosed in US Pat Pub. 2015-0334125A1 and the reader of the present disclosure is presumed to have studied and to understand that publication. The reader is also presumed to be familiar with RNNs, LSTMs, and how to write application programs in source languages to implement RNNs and LSTMS or how to adapt existing third-party program libraries or open source projects, if any, that implement RNNs and LSTMs in other contexts, if any.

The first level of the network traffic classification system computes proxy log representation using proxy log fields, such as the URL, flow duration, number of bytes transferred from client to server and from server to client, autonomous system, user agent, referrer value, MIME-Type, and HTTP status. Some or all such values may be obtained from HTTP header values that have been written to the proxy log. "Proxy log," in this context, refers to a data file that is written at an endpoint proxy device such as a gateway, firewall, or other element of internetworking infrastructure or gear; server log files and other data records indicating network traffic or flows also may be used and the term "proxy log" is not intended to limit the scope of embodiments. Typically one log record is created and stored in response to every internet request that is identified at a proxy device. Requests may include HTTP GET or POST operations, FTP upload or download operations, etc.

In an embodiment, HCS logic 200 is programmed to perform automatic learning of flow representation to yield more accurate classifiers. In the second level of the network classification system, a collection of flows from a particular user machine to a domain within a particular interval, such as five minutes, can be analyzed. The result, which represents the behavior of a user machine, can be aggregated over longer periods of time, such as a 24-hour window. As explained later, a third classification level may perform such aggregation. Other periods of minutes or hours may be used in all aspects of the process depending on the available computing power and there is no limit, in embodiments, to use a particular maximum amount of data. Analysis of a full day of data may be beneficial for malware installed on an infected machine that establishes a persistent connection and makes periodic contacts to a command and control (C&C) server. These communications could be manifested as short intervals of traffic with intervals of several minutes to hours between subsequent connections. Of course, not all persistent connections are malicious.

Long Short-Term Memory (LSTM) data processing architectures are useful for processing sequential data where it is important to consider contextual information. A single LSTM memory block or cell consists of three activation functions, one input, and one output for each block. The activation functions control the influence of the input gate, output gate, and forgetting. The gates are multiplicative in nature, which allows for the memory block to store information over longer periods of time and thus addresses the vanishing gradient problem. A bidirectional version of the architecture allows for capturing the context from both sides, forward/future and backward/past.

The inventors, in an inventive moment, recognized the benefit of using an LSTM to model long-range dependencies in sequential data as applied to network traffic modeling. For example, persistent connections manifested by malware can have long intervals between malicious communications, and the inventors recognized that LSTM architecture can capture such communication as well as any associated contextual information. Therefore, network elements programmed using the techniques herein learn to recognize the malware behavior mixed into the background traffic. In an embodiment, HCS logic 200 is programmed to automatically learn the representation of flows and communication to particular domains, for example, by combining numerical proxy log attributes with representation of URLs, inspired by natural language processing systems that analyze whole sentences.

Figure 2:
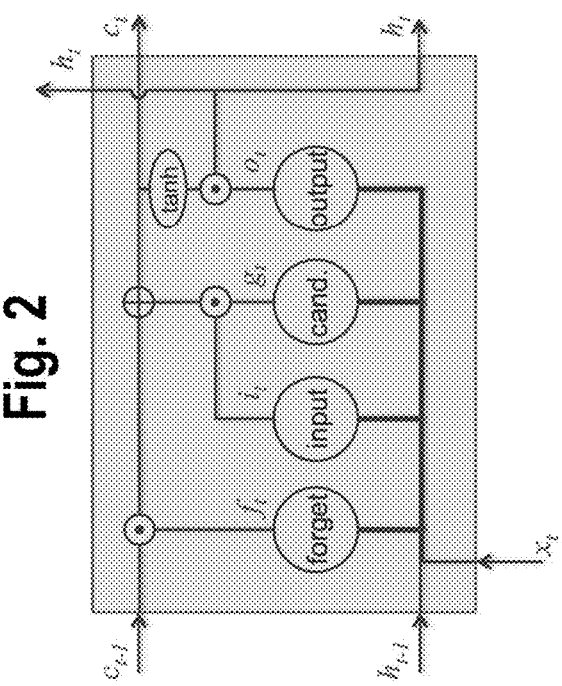
FIG. 2 illustrates an example computational diagram of an LSTM, which may be implemented using hardware logic, programmed software, or a combination thereof.

FIG. 2 illustrates an example computational diagram of an LSTM, which may be implemented using hardware logic, programmed software, or a combination thereof. An LSTM memory unit is controlled by input ($f_i$), forgetting ($f_f$), and output ($f_o$) updates. In addition, state candidate values ($g_t$) influence the memory contents $c_t$. The output and state candidate are used to update the hidden state $h_t$.

The inventors also recognized in an inventive moment that combining LSTM memory cells as nodes in a recurrent neural network would yield superior solutions to the specified problems. Recurrent neural networks (RNN) update a hidden vector $h_t$ and accept input $x_t$ at every time step t. The update of $h_t$ is a function of $x_t$ and the hidden vector at the previous time step $h_{t-1}$. The function introduces a non-linearity and is chosen typically as tan h or a rectified linear unit (ReLU). LSTM architectures address the exploding and vanishing problem by learning over long-term dependencies by introducing a memory cell representation.

In an embodiment, an RNN programmed to recognize malware behavior based upon network traffic is formed of LSTM memory cells, each memory cell controlled by a gating mechanism with three types of updates, $i_t$, $f_t$, $o_t \in R^n$ that range between 0 and 1. The value $i_t$ controls the update of each memory cell, $f_t$ controls the forgetting of each memory cell, and $o_t$ controls the influence of the memory state on the hidden vector. The values at the gates are computed as follows:

forget gate: $f_t = \sigma(W_f[h_{t-1}, x_t] + b_f)$ input gate: $i_t = \sigma(W_i[h_{t-1}, x_t] + b_i)$ output gate: $o_t = \sigma(W_o[h_{t-1}, x_t] + b_o)$ The parameters of the weights W and biases b are learned from training sequences. In addition to the gate values, each LSTM unit computes state candidate values $g_t = \tan h(W_g[h_{t-1}, x_t] + b_g)$, where $g_t \in R^n$ ranges between −1 and 1 and influences memory contents. The memory cell is updated by $c_t = f_t \odot c_{t-1} + i_t \odot g_t$ which additively modifies each memory cell. The update process results in the gradients being distributed during back propagation. The symbol (·) denotes the element-wise multiplication. Finally, the hidden state is updated as:

$h_t = o_t \odot \tan h(c_t)$.

Figure 3:
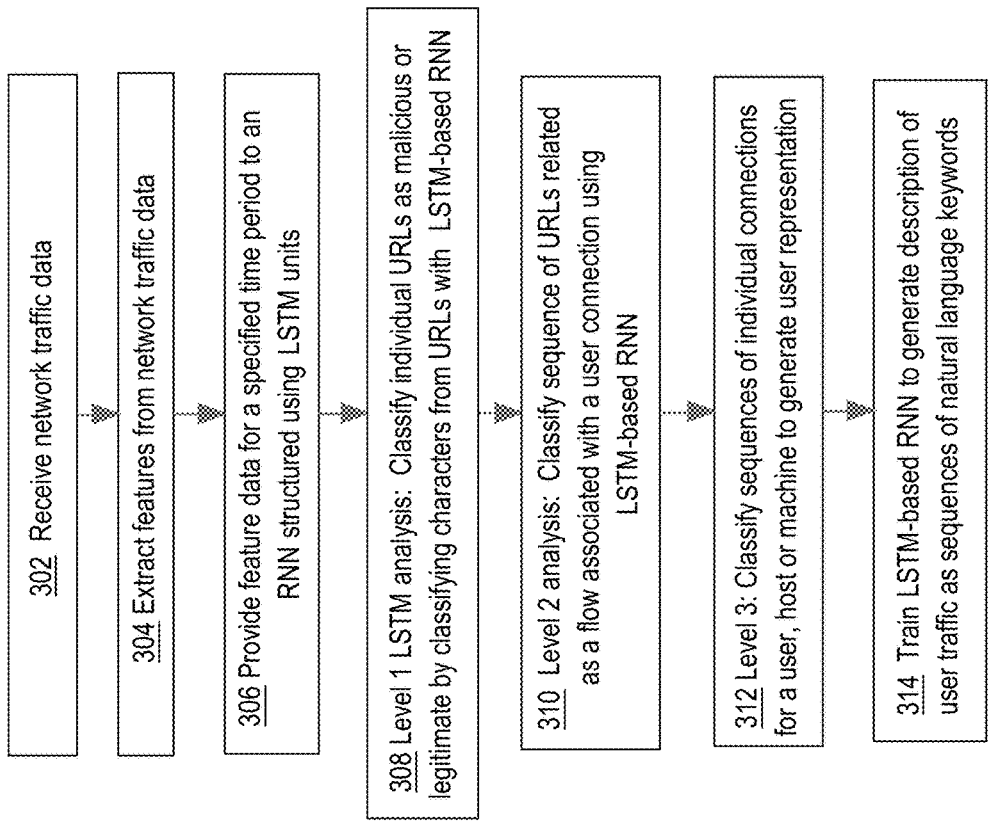
FIG. 3 illustrates a process of generating descriptions of network security events using an LSTM-based RNN and multiple levels of training and classification.

FIG. 3 illustrates a process of generating descriptions of network security events using an LSTM-based RNN and multiple levels of classification. The process of FIG. 3, and each other flow diagram, algorithm, architecture and operational sequence illustrated or described in this disclosure, may be implemented using one more computer programs, software elements, or other elements of hardware logic or software logic in the operational environment of FIG. 1. For example, HCS logic 200 may implement FIG. 3 and the other operations described herein. FIG. 3, and the prose descriptions of functional operations herein, are intended to communicate programmable algorithms to those of skill in the art to which this disclosure pertains, at the same level of detail that those of skill normally use to communicate programming plans, interfaces, methods, data structure definitions, and other structure or process information sufficient to begin implementing programs which, when executed, can carry out the functions that are described.

At block 302, the process receives network traffic data. Network traffic data may comprise individual URLs, or entire files such as proxy logs. For example, HCS logic 200 may import packet flow logs and analyze them rather than receiving packet flows 154 directly from network. For example, the HCS logic 200 may receive logs from gateway system 115 as well as other systems on the network, such as proxy 125.

At block 304, the process extracts relevant fields from the network traffic data. Specifically, proxy log fields are extracted from proxy logs, such as the URL, flow duration, number of bytes transferred from client to server and from server to client, autonomous system, user agent, referrer value, MIME-Type, and HTTP status At block 306, the feature data for a collection of flows for a specified time period is provided as input to an RNN that has been structured using LSTM units in the manner previously described. The RNN may be structured using multiple functional levels to operate as next described for blocks 308, 310, 312. For purposes of illustrating a clear example, the process of FIG. 3 focuses on classification using an LSTM-based RNN, and this description presumes that the RNN already has been trained using an adequate training dataset obtained from sources of known malicious and known legitimate traffic, such as URL blacklist sources, open databases published by malware vendors, or other sources.

At block 308, the process performs a first level of LSTM-based analysis in which individual URLs are classified as malicious or legitimate based upon providing individual characters of a URL to a set of LSTMs that analyze or model individual characters. Block 308 may also involve using field data for a particular URL and classifying that field data, using an LSTM-based RNN that was previously trained on a character basis using other URLs, to output a classification of whether the particular URL is malicious or legitimate. Typically this output classification is not used to directly drive decisions whether to admit or block access to the URL, because the false positive rate is too high. The output classification may be classified by a classifier, such as a Softmax function. A Softmax function is a normalized exponential that maps vectors and indexes into real values. The Softmax function is just one example of a classifier that may be used in conjunction with the LSTM-based RNN discussed herein, and the embodiments should not be limited to this particular classifier.

At block 310, the process performs a next level of LSTM-based analysis in which a sequence of multiple URLs, which are related together as a flow and relate to the same user connection that is emitting or processing the flow, are obtained and provided to the LSTM-based RNN for classification of flows as malicious or legitimate. With this approach, groups of URLs that are related as flows may be used to classify particular user connections, which are emitting those flows, as carrying out malicious or legitimate network events, transactions or operations. Additional information may be use besides the URLs, such as field data discussed above, or any other available information.

At block 312, another level of LSTM-based RNN classification is performed to classify sequences of multiple different individual connections for an individual user. This stage permits the system to classify whether groups of connections associated with a particular user, host or machine are legitimate or malicious, and ultimately may be used to identify an infected or compromised host computer that is associated with the user. In an embodiment, the classification of groups of connections results in generating a user representation. In this context, a user representation aggregates lower-level representation of user connections and encodes an overall representation of the network traffic from the computing device of the user. The user traffic representation reflects the nature of the traffic and may contain particular malware communication.

At block 314, the LSTM-based RNN is used to generate descriptions of user traffic in the form of sequences of natural language keywords that are understandable to network administrators, security professionals, other end users, and/or other systems, programs and computers.

The descriptions that are generated at block 314 may be used in different ways in various embodiments, including but not limited to: using all the classification outputs developed in preceding stages of FIG. 3 to select a sequence of natural language keywords that can express a result of analysis and, possibly, a categorization of a particular user, connection or set of connections, URL or set of URLs; using the descriptions in remediation efforts, analysis or other reporting; using the descriptions or classification output to drive individual real-time operations with respect to network traffic that is traversing the network, including individual decisions to block, or permit, access to a particular URL, or to forward or drop a particular packet.

Specific implementation details of the foregoing steps are now addressed.

3. EXAMPLE IMPLEMENTATION OF CLASSIFICATION AND DESCRIPTION METHODS

3.1 Sequences of Characters in URL Strings

The inventors have also recognized that the structure of a URL can be used to infer the topic of a web page to which it points. TABLE 1 illustrates examples of malicious and legitimate URLs with encoded strings:

TABLE 1

Example malicious and legitimate URLs malicious hxxp://1kckclckllili[.]com/zKG2ZB1X6M5xt5c1Y2xrPTEuNyZiaWQ9...
hxxp://109.235.54[.]162/m/IbQEZVVjipFdkB0KHeNkNuGBabgSr2z3...
hxxp://78.140.164[.]160/jjlqXpP/~GIja7A3q/KqRSx+1s8kNC=/%2BsI...
hxxp://masterproweb[.]net/images2/BD3006FB490CADF111E40696D3...

legitimate http://www.thespec.com/DependencyHandler.axd/L0Rlc2t0b3BNb2R1b...
http://www.degruyter.com/assets/virtual/H4sIAAAAAAAAAKWSwUo...
http://www.1001pneus.fr/ls/YToxNzp7czo0OiJwYWdlIjtzOjY6InNlYX...

In this example, the malicious URLs are related to Dridex, Palevo worm and Alureon Trojan attacks. Frequent use of special characters such as question marks, equal signs, pluses, minuses, dots, and slashes is a promising indicator of a potentially malicious URL. C&C communication sometimes uses encrypted strings in the URL to transfer commands or information, as seen in FIG. 2. Features learned from the strings using machine learning can be used to detect such communication even without knowing the encryption algorithm.

In an embodiment, classifiers can be trained to distinguish between malicious and legitimate URLs, replacing what previously would be manually supplied expert knowledge, even for encrypted strings in URLs. In an embodiment, character sequences in URLs are modeled using LSTMs. The individual URL characters are used as inputs to an LSTM which trains the representation from a large database of malicious and legitimate URLs. The representation is learned along with the classifier which indicates how likely a given URL is malicious.

Figure 4:
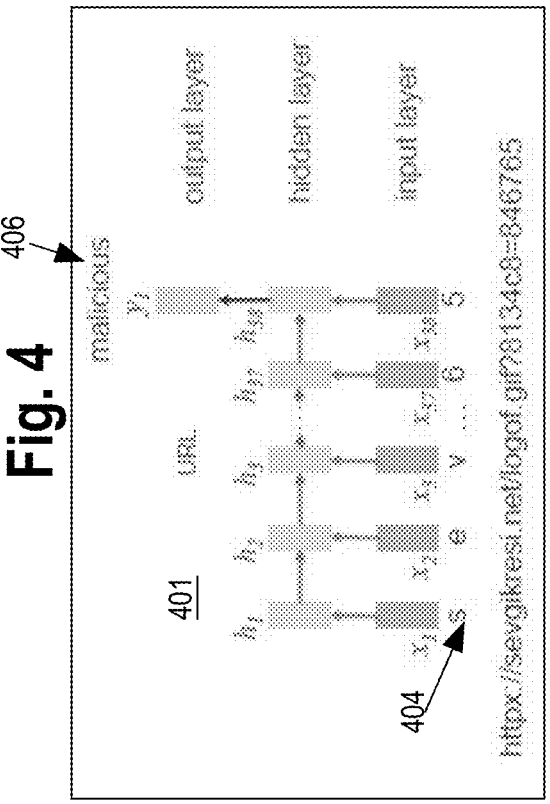
FIG. 4 illustrates an LSTM with inputs for training from characters in a URL to classify them as malicious or legitimate, with specific training from a particular URL to result in a malicious classification.

FIG. 4 illustrates an LSTM with inputs for training from characters in a URL to classify them as malicious or legitimate, with specific training from a particular URL to result in a malicious classification. In the example of FIG. 4, a URL 402 is divided into individual characters 404, each of which is presented to an input of an LSTM unit at the input layer of an RNN 401. Output from that particular LSTM unit for a particular character classifies the character and is provided to another LSTM at the hidden layer of the RNN. Hidden layer outputs are combined and presented as input to the output layer which yields a final classification output 406 (or $y_1$) specifying whether the input URL is malicious or legitimate.

Alternatively, relations between character sequences can be captured by a convolutional neural network. Such model was trained to classify five categories of URLs corresponding to click fraud (CFRD), C&C channel communication using domains generated by a domain generation algorithm (GENDOM), legitimate traffic (LEGIT), phishing (PHISH), and C&C channel communication through encrypted strings in the URL (TUNNEL), with 5,000 training URLs in each category. The classification results on the testing set is shown in a confusion table denoted TABLE 2:

TABLE 2

Confusion table showing the percentage of the overall testing set classified according to the category in the rows with the true category in the columns. Most entries are on the diagonal, which indicates high accuracy of the classifier.

| detection | label | | | | | count |
| --- | --- | --- | --- | --- | --- | --- |
| | CFRD | GENDOM | LEGIT | PHISH | TUNNEL | |
| CFRD | 5.1996 | 0 | 0 | 0.6985 | 0 | 35660 |
| GENDOM | 0 | 2.1715 | 0.0073 | 0 | 0.1523 | 11075 |
| LEGIT | 0 | 0.0029 | 77.9809 | 0 | 0.0646 | 533054 |
| PHISH | 0.0413 | 0 | 0.0029 | 4.7267 | 0 | 27891 |
| TUNNEL | 0 | 0.4395 | 0.0160 | 0.0051 | 8.4910 | 56711 |
| total | | | | | | 664391 |

Each category has a different number of testing samples as shown in the last column. Each entry in the table shown the percentage of the overall testing set classified according to the category in the rows with the true category in the columns. For example, it can be seen that 77.98% of all traffic is correctly classified as legitimate. Obviously, more entries are on the diagonal of the confusion table (with zeros elsewhere) indicates higher performance of the classifier. Some confusion between the malicious domains can be caused by slight overlaps of the behaviors (e.g. communication with encrypted string might use a generated domain).

The results are reported in terms of true detections and false detections in TABLE 3:

TABLE 3

True detections and false detections using all testing URLs. 98.5697% of all URLs is classified correctly. There is still 0.0675% of all legitimate traffic classified into one of the malicious categories which necessitates additional attributes and higher-level models.

| detection | label | |
| --- | --- | --- |
| | true det | false det |
| CFRD | 5.1996 | 0.6985 |
| GENDOM | 2.1715 | 0.1596 |
| LEGIT | 77.9809 | 0.0675 |
| PHISH | 4.7267 | 0.0442 |
| TUNNEL | 8.4910 | 0.4606 |
| total | 98.5697 | 1.4304 |

Thus, in an embodiment, 98.57% of all URLs were classified correctly, without defining any features prior to classifier training; the LSTM was trained solely from the characters of the URL strings. Clearly, the classifier cannot be used alone in any intrusion detection system since there is still 0.0675% of all legitimate traffic classified into one of the malicious categories. However, using this representation with additional attributes, such as proxy log fields or in a higher-level model may improve performance.

3.2 Unsupervised Training

Figure 5:
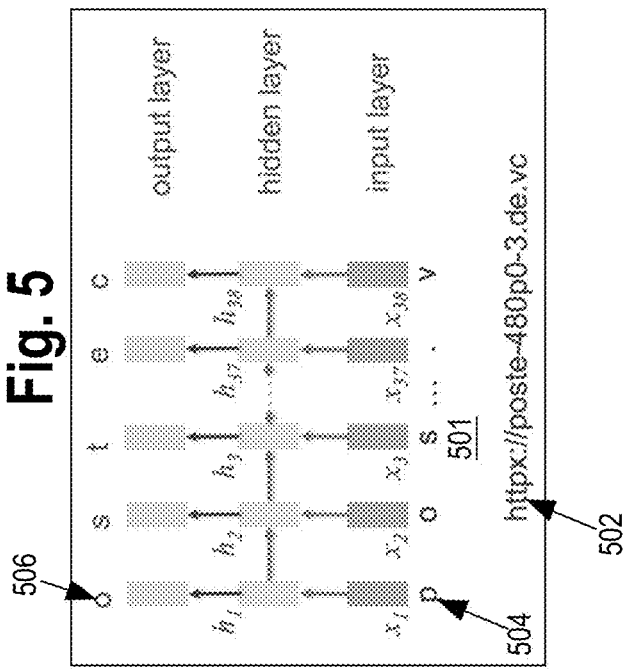
FIG. 5 illustrates unsupervised training of an LSTM network for predicting next characters in a URL.

LSTMs can be trained in the many-to-many setting, where there are multiple inputs and multiple outputs. The inputs are individual URL characters as before. Given a sequence of already processed characters, the network is trained to predict the next character in the URL sequence. FIG. 5 illustrates unsupervised training of an LSTM network for predicting next characters in a URL. A particular URL 502 serves as input and is divided into individual characters 504 which are presented as input to individual LSTM units at an input layer of an RNN 501. These yield output at a hidden layer and an output layer in which the output of a top-level LSTM unit provides a prediction output 506 of the next character that is predicted to follow.

This seemingly impractical task has broad consequences. The network is forced to train a representation of the inputs such that the prediction is reliable. The representation uses a fixed number of parameters and can then be used in other tasks such as classification. Importantly, it is trained in an unsupervised manner, that is, labels are not needed.

Figure 7:
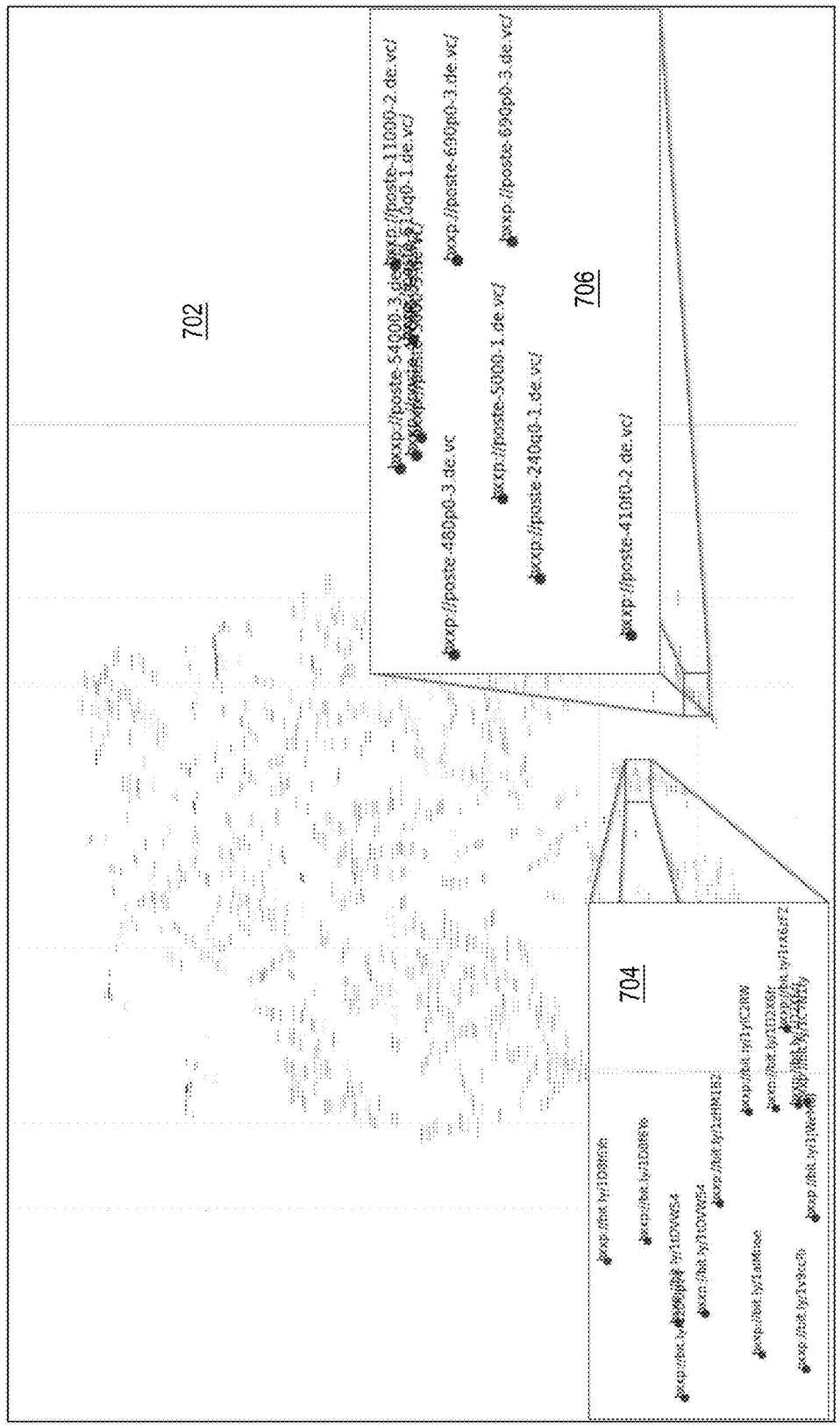
FIG. 7 is a two-dimensional visualization of 1,000 URLs, indicating that similar URLs are nearby and therefore having similar representation.

In preliminary experiments, the inventors trained a model programmed in the manner herein using 25,000 sample URLs obtained from the PHISHTANK data source. The final representation was visualized by a projection to two dimensions using t-SNE software, which preserves distance from the original n-dimensional space in the projected 2D space. FIG. 7 is a two-dimensional visualization of 1,000 URLs. In the example of FIG. 7, visualization 702 comprises enlarged graph regions 704, 706 each illustrating a plurality of data points and URL values associated with the data points. When similar URLs are nearby, the URLs have similar representation.

3.3 Sequences of Flows for a User Connection

The inference based on individual URLs can already filter out much of the legitimate traffic or even correctly classify various categories of malicious communication. However, the amount of information that can be extracted from a single URL is limited which further limits the accuracy of the classifiers. In an embodiment, the classifier models not only individual URLs, but a sequence of URLs or sequence of flows (proxy logs) in user connections. A user connection, in this context, is all user flows with the same source and destination hostname (or IP address) in a given time window. A sequence of such flows (or URLs) is then used as input into LSTM. The URL representation described above could be used to prepare inputs for this LSTM.

Figure 8:
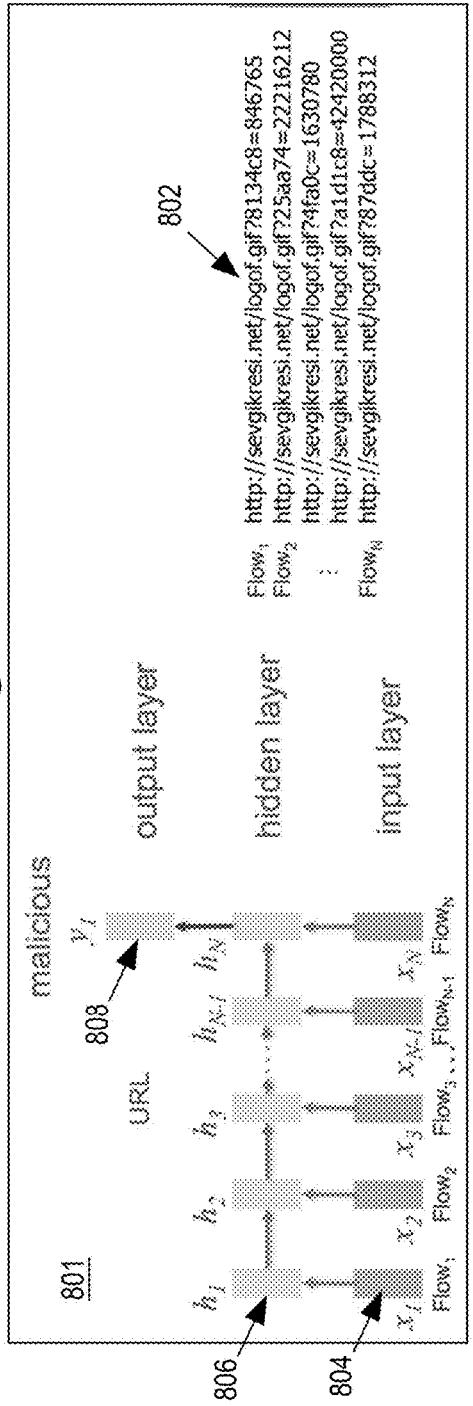
FIG. 8 illustrates an example LSTM architecture for training using a sequence of URLs or flows.

FIG. 8 illustrates an example LSTM architecture for training using a sequence of URLs or flows. A plurality of flows denoted 802, consisting of individual flows labeled Flow1, Flow2, etc., are presented as input to individual per-flow LSTM units 804 at the input layer of an RNN 801 and which provide classification output to LSTMs 806 at the hidden layer of the RNN. Hidden layer LSTMs 806 generate classification output to a single LSTM unit 808 at the output layer which yields a final classification output $y_i$ indicating whether the group of flows, and therefore a user connection, appears malicious or legitimate.

In one experiment, the inventors used over five hundred engineered features which were computed for each flow, permitting testing each component independently for evaluation. In the embodiment of FIG. 8, a LSTM is trained for each user connection defined as a sequence of flows with the same source and destination hostname (or IP address). The example sequence of URLs is from the malware Sality. The model was trained using records of two days of network traffic from over two hundred companies, containing about 160,000,000 flows and 167,000 bags. The validation dataset consisted of one day of traffic with about 80,000,000 flows and 39,000 hosts. Testing on one day of traffic with about 80,000,000 flows and 44,000 hosts resulted in 79.31% precision and 96.64% recall.

3.4 Sequences of User Connections

In an embodiment, an LSTM system can be trained to classify sequences of individual connections for each user. This is especially important since malware tends to communicate with multiple hostnames. The ability of LSTM to model long-range dependencies is useful when modeling C&C channel communication that can be periodic but quite infrequent. Again, the representation of user connections serves as input for the user-level LSTM.

Figure 9:
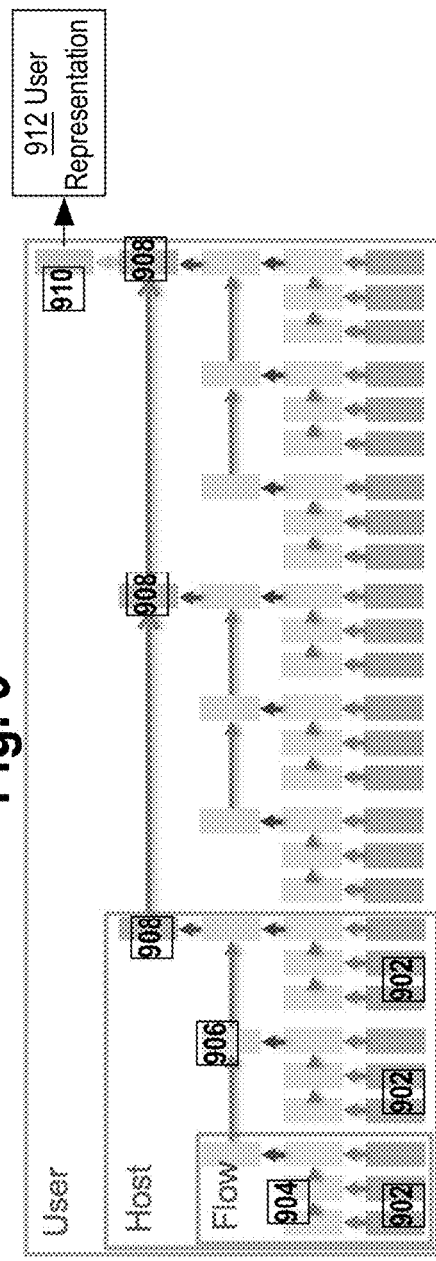
FIG. 9 illustrates output of LSTMs trained to represent individual flows and used as input for a next level of training for user connections.

FIG. 9 illustrates output of LSTMs trained to represent individual flows and used as input for a next level of training for user connections. In an embodiment, a plurality of flow data for individual flows associated with a particular host computer are classified at an input layer 902 and a hidden layer 904 resulting in a flow-level output 906 specifying whether a particular set of flow data is malicious or legitimate. Flow-level output 906 is further classified at the host level to yield a host-level output 908 indicating whether the host, or a connection associated with it, is malicious or legitimate. Multiple host-level outputs 908, as seen in FIG. 9, indicate that the same user is working with multiple different hosts. "Host," in this context, may be a computer, device or process. Alternatively, "User" in FIG. 9 may refer to a single computer, and "Host" may refer to processes executing on that computer.

A plurality of host-level outputs 908 all associated with the same user of multiple hosts may be classified further to yield a user-level result 910 which may comprise a sequence of keywords that represent a holistic view of user activity. Thus, the output of LSTMs trained to represent user connections is used as input for a final level of training representing all communication of a user and may be created and stored as a user representation 912, which may be used to generate metadata describing the user communication. Example metadata includes a plurality of host identifiers, timestamps, and classification outputs such as malicious or legitimate.

3.5 Keyword Description of User Connections

In an embodiment, LSTMs are trained to generate a description of user traffic or malware communication using a one-to-many architecture, where the representation of the user communication serves as input. The architecture then focuses on various parts of this representation to generate description as a sequence of keywords.

Figure 10:
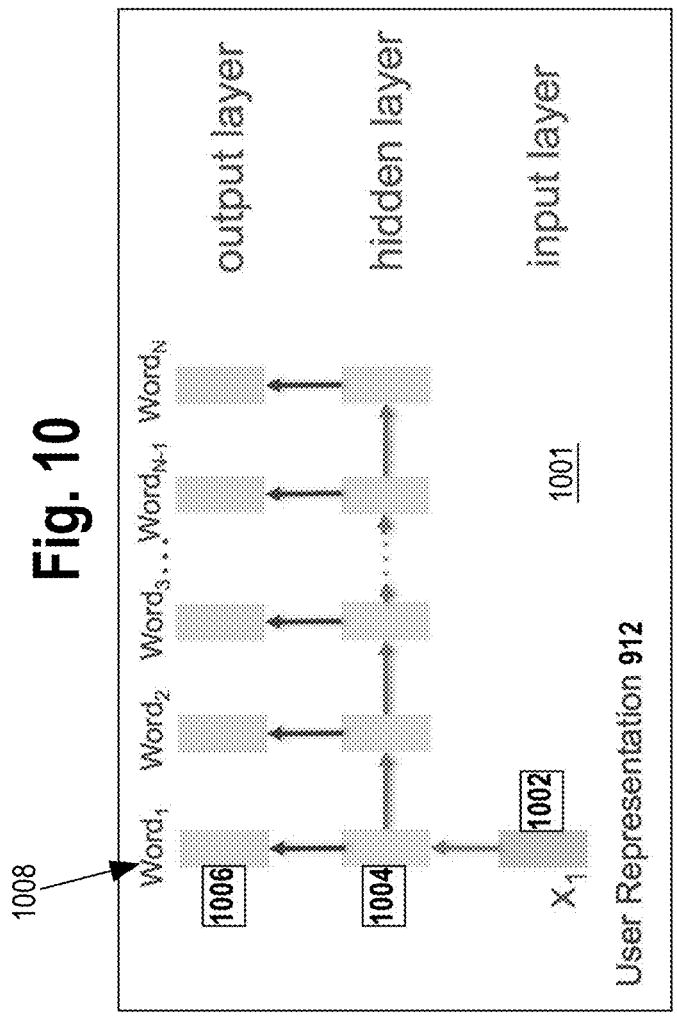
FIG. 10 illustrates an LSTM network for training keyword descriptions of user traffic from learned representations.

FIG. 10 illustrates an LSTM network for training keyword descriptions of user traffic from learned representations. User representation 912 generated at FIG. 9 is provided as input to a first LSTM 1002 at an input layer of an RNN 1001 that has been trained for generating keywords as output. LSTM 1002 provides output to a set of second level LSTMs 1004 at a hidden layer of the RNN, which in turn provide output to output layer LSTMs 1006. These LSTMs provide output in the form of a classified word 1008, labeled Word1, Word2, etc., which may be natural language words or phrases. In an embodiment, the description focuses on phrases characterizing the traffic of each user. For example, phrases may correspond to individual events, such as "suspicious executable download", "communication with generated domain", "communication through encrypted strings in the URL", "unusual advertisement traffic", and many others.

4. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
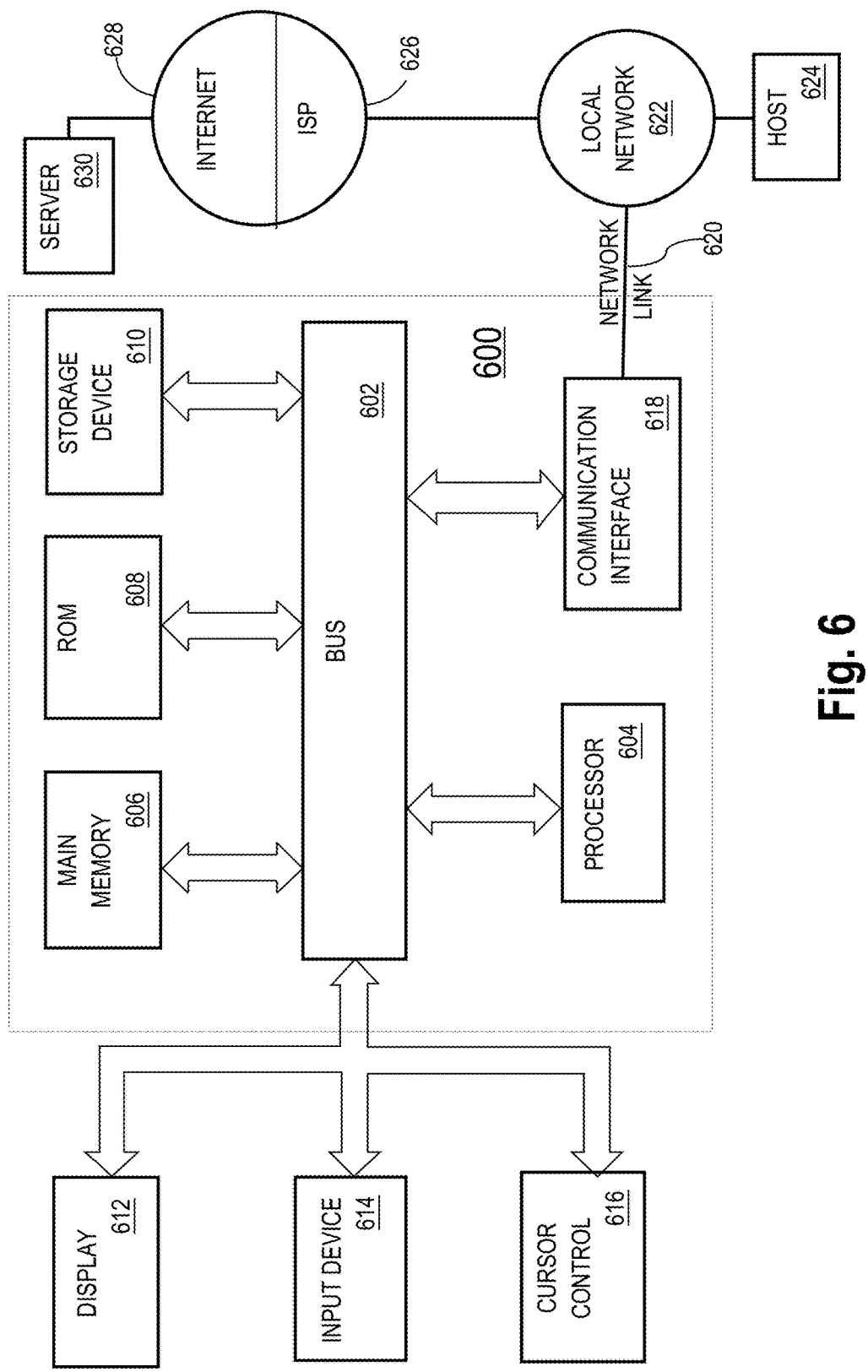
FIG. 6 is a block diagram that illustrates a computer system 600 upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

5. EXTENSIONS AND ALTERNATIVES

The process described herein of determining flow length characteristics using a network infrastructure device, and the process of using a collector device to analyze the flow length characteristics and take responsive action, may be implemented independently or in combination. For example, when an independent approach is used, the collector device may be programmed to perform: receiving, at the collector device, a first length of a first datagram, a second length of a second datagram, and a duration between a first arrival of the first datagram and a second arrival of the second datagram; determining, using the first length, second length, and duration, an application associated with the first datagram and the second datagram; in response to determining that the application is a known malicious application, sending an alert; wherein the method is executed by one or more computing devices. In one approach, determining the application further comprises using a trained classifier, wherein the trained classifier is trained on training data from a software application reporting a name and a hash for the software application associated with a flow. The collector device may be programmed for accessing a file reputation service determine a reputation of the application. In some embodiments the application is a client application. In one approach, determining the application is performed in retrospect to detect a malicious application that was unknown when the first length, the second length, and the duration were received.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
executing, in computer memory, a recurrent neural network (RNN) comprising a plurality of nodes each implemented as a Long Short-Term Memory (LSTM) cell and comprising a plurality of links between nodes that represent outputs of LSTM cells and inputs to LSTM cells, wherein each LSTM cell implements an input layer, hidden layer and output layer of the RNN;
receiving, from a networked computer, network traffic data associated with one or more networked computers;
extracting feature data representing a plurality of features of the network traffic data and providing the feature data to the RNN;

classifying one or more individual Uniform Resource Locators (URLs) as malicious or legitimate using a plurality of first LSTM cells of the input layer, wherein inputs to the first LSTM cells are individual characters of the one or more URL;

receiving a feature representation as input, the feature representation being associated with a particular connection of a particular computer, classifying the feature representation as malicious or legitimate using the RNN and creating and storing a connection data item that specifies whether the particular connection is malicious or legitimate based upon the preceding classifying of the feature representation;

based on the connection data item, generating signals to a firewall device specifying either admitting or denying the particular connection.

2. The data processing method of claim 1 wherein the first LSTM cells are used to generate the feature representation, the feature representation is classified with one or more classifiers of at least one of individual proxy logs, events, or user representations, and wherein the classifying of the feature representation as malicious or legitimate uses the one or more classifiers.

3. The data processing method of claim 1, further comprising using a plurality of second LSTM cells that are different from the first LSTM cells to classify the feature representation as malicious or legitimate.

4. The data processing method of claim 3, wherein the plurality of second LSTM cells are used to classify a plurality of feature representations of connections of the computer to result in creating and storing a plurality of connection data items for the connections of the computer, the method further comprising using the RNN and a plurality of third LSTM cells that are different from the first LSTM cells and the second LSTM cells, classifying the plurality of connection data items representing prior classifications of a plurality of flows associated with particular connections to result in outputting a user representation for the particular connections.

5. The data processing method of claim 4, further comprising using the RNN and a plurality of fourth LSTM cells to classify the user representation to result in outputting a description sequence of natural language words that describe one or more security risks associated with the particular user representation or computer.

6. The data processing method of claim 1, further comprising:
receiving a plurality of proxy logs of network traffic data, each proxy log comprising at least one URL accessed by a client device of a plurality of client devices in a time period;
for each proxy log of the plurality, grouping network traffic data by connection, wherein the connection comprises one or more data flows from a particular client device of the plurality of client devices to a particular host;
processing, using the LSTM, each proxy log using the grouped network traffic data to generate first output indicating whether a connection is malicious.

7. The data processing method of claim 1, further comprising receiving the network traffic data associated with the one or more networked computers as a plurality of flow data records that have been exported from an internetworking device that is interposed between a remote site computer and a central server computer.

8. The data processing method of claim 1, wherein each of the LSTM memory cells is controlled by gates that are responsive to updates denoted $i_t$, $f_t$, $o_t \in R^n$ that range between 0 and 1, wherein it controls an update of each memory cell, $f_t$ controls a forgetting of each memory cell, and $o_t$ controls an influence of a memory state on a hidden vector of the RNN.

9. The data processing method of claim 8, further comprising computing values $i_t$, $f_t$ and $o_t$ as:

forget gate: $f_t = \sigma(W_f[h_{t-1}, x_t] + b_f)$ input gate: $i_t = \sigma(W_i[h_{t-1}, x_t] + b_i)$ output gate: $o_t = \sigma(W_o[h_{t-1}, x_t] + b_o)$ wherein weights W and biases b are learned from training sequences.

10. The data processing method of claim 9, wherein each of the LSTM cells is programmed to compute state candidate values $g_t = \tan h(W_g[h_{t-1}, x_t] + b_g)$, where $g_t \in R^n$ ranges between −1 and 1 and influences memory contents; wherein each of the LSTM cells is updated by $c_t = f_t \odot c_{t-1} + i_t \odot g_t$ which additively modifies each of the LSTM cells; wherein (·) denotes element-wise multiplication.

11. The data processing method of claim 10, wherein a hidden state of the RNN is updated as:

$h_t = o_t \odot \tan h(c_t)$.

12. A system comprising:
one or more processors;
an electronic digital memory storing one or more sequences of instructions which, when executed by the one or more processors, cause the one or more processors to perform:
executing, in computer memory, a recurrent neural network (RNN) comprising a plurality of nodes each implemented as a Long Short-Term Memory (LSTM) cell and comprising a plurality of links between nodes that represent outputs of LSTM cells and inputs to LSTM cells, wherein each LSTM cell implements an input layer, hidden layer and output layer of the RNN;
receiving, from a networked computer, network traffic data associated with one or more networked computers;
extracting feature data representing a plurality of features of the network traffic data and providing the feature data to the RNN;
classifying one or more individual Uniform Resource Locators (URLs) as malicious or legitimate using a plurality of first LSTM cells of the input layer, wherein inputs to the first LSTM cells are individual characters of the one or more URL;
receiving a feature representation as input, the feature representation being associated with a particular connection of a particular computer, classifying the feature representation as malicious or legitimate using the RNN and creating and storing a connection data item that specifies whether the particular connection is malicious or legitimate based upon the preceding classifying of the feature representation;
based on the connection data item, generating signals to a firewall device specifying either admitting or denying the particular connection.

13. The system of claim 12 wherein the first LSTM cells are used to generate the feature representation, the feature representation is classified with one or more classifiers of at least one of individual proxy logs, events, or user representations, and wherein the classifying of the feature representation as malicious or legitimate uses the one or more classifiers.

14. The system of claim 12 wherein the sequences of instructions further cause, when executed by the one or more processors, the one or more processors to perform:
using a plurality of second LSTM cells that are different from the first LSTM cells to classify the feature representation as malicious or legitimate.

15. The system of claim 14, further comprising using the RNN and a plurality of third LSTM cells that are different from the first LSTM cells and the second LSTM cells, wherein the plurality of second LSTM cells are used to classify a plurality of feature representations of connections of the computer to result in creating and storing a plurality of connection data items for the connections of the computer, the method classifying the plurality of connection data items representing prior classifications of a plurality of flows associated with particular connections to result in outputting a user representation for the particular connections.

16. The system of claim 15, further comprising using the RNN and a plurality of fourth LSTM cells to classify the user representation to result in outputting a description sequence of natural language words that describe one or more security risks associated with the particular user representation or computer.

17. The system of claim 12, further comprising:
receiving a plurality of proxy logs of network traffic data, each proxy log comprising at least one URL accessed by a client device of a plurality of client devices in a time period;
for each proxy log of the plurality, grouping network traffic data by connection, wherein the user connection comprises one or more data flows from a particular client device of the plurality of client devices to a particular host;
processing, using the LSTM, each proxy log using the grouped network traffic data to generate first output indicating whether a connection is malicious.

18. A computer-implemented data processing method providing an improvement in computer security and comprising:
using programmed computer instructions, executing, in computer memory, a recurrent neural network (RNN) comprising a plurality of nodes each implemented as a Long Short-Term Memory (LSTM) cell and comprising a plurality of links between nodes that represent outputs of LSTM cells and inputs to LSTM cells, wherein each LSTM cell implements an input layer, hidden layer and output layer of the RNN;
receiving, from a networked computer, network traffic flow data associated with one or more networked computers;
extracting feature data representing a plurality of features of the network traffic flow data and providing the feature data to the RNN;
classifying one or more individual Uniform Resource Locators (URLs) as malicious or legitimate using a plurality of first LSTM cells of the input layer, wherein inputs to the first LSTM cells are individual characters of the one or more URLs, and wherein the first LSTM cells generate a feature representation based upon the feature data, wherein the feature representation is classified with a classifier;
based on the feature representation, generating signals to a firewall device specifying either admitting or denying the one or more URLs.

19. The method of claim 18 wherein the sequences of instructions further cause, when executed by the one or more processors, the one or more processors to perform:
using the RNN and a plurality of second LSTM cells that are different from the first LSTM cells, receiving the feature representation, wherein the feature representation is associated with a particular user connection of a particular computer user, host or machine;
classifying the feature representation as malicious or legitimate using the RNN, the plurality of second LSTM cells, and the classifier;
creating and storing a connection data item that specifies whether the particular user connection is malicious or legitimate based upon the preceding classifying of the feature representation; and
based on the connection data item, generating signals to a firewall device specifying either admitting or denying the particular user connection.

20. The method of claim 18 wherein the first LSTM cells are used to generate the feature representation, the feature representation is classified with one or more classifiers of at least one of individual proxy logs, events, or user representations, and wherein the classifying of the feature representation as malicious or legitimate uses the one or more classifiers.

* * * * *

UNITED STATES PATENT AND TRADEMARK OFFICE
CERTIFICATE OF CORRECTION

PATENT NO. : 10,412,105 B2
APPLICATION NO. : 16/161572
DATED : September 10, 2019
INVENTOR(S) : Michal Sofka Page 1 of 1

It is certified that error appears in the above-identified patent and that said Letters Patent is hereby corrected as shown below:

In the Specification

Column 5, Line 64, please amend as shown:
linearity and is chosen typically as tanh or a rectified linear Column 6, Line 19, please amend as shown:
$g_t = \tanh(W_g[h_{t-1}, x_t] + b_g)$, Column 6, Line 28, please amend as shown:
$h_t = o_t \odot \tanh(c_t)$.

Column 9, Line 15, please delete:
"label"

Column 9, Line 16, please delete:
"\label"

Column 9, Line 45, please delete:
"label"

Column 9, Line 46, please delete:
"\label"

In the Claims

Column 16, Line 19, please amend as shown:
$g_t = \tanh(W_g[h_{t-1}, x_t] + b_g)$, Column 16, Line 30, please amend as shown:
$h_t = o_t \odot \tanh(c_t)$.

Signed and Sealed this
Fourteenth Day of July, 2020

Andrei Iancu
*Director of the United States Patent and Trademark Office*